United States Patent
Sabhapathi et al.

(10) Patent No.: US 12,308,456 B2
(45) Date of Patent: May 20, 2025

(54) CORNER SHIELD FOR ELECTRIC VEHICLE BATTERY BOX

(71) Applicant: Tenneco Automotive Operating Company Inc., Lake Forest, IL (US)

(72) Inventors: Akhil Reddy Sabhapathi, Ann Arbor, MI (US); Brian A. Kunkel, Dexter, MI (US); John Stanavich, Chelsea, MI (US); Daniel Salanta, Ann Arbor, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 552 days.

(21) Appl. No.: 17/869,914

(22) Filed: Jul. 21, 2022

(65) Prior Publication Data
US 2024/0030537 A1    Jan. 25, 2024

(51) Int. Cl.
| | |
|---|---|
| *H01M 50/242* | (2021.01) |
| *H01M 50/209* | (2021.01) |
| *H01M 50/224* | (2021.01) |
| *H01M 50/249* | (2021.01) |

(52) U.S. Cl.
CPC ....... *H01M 50/242* (2021.01); *H01M 50/209* (2021.01); *H01M 50/224* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,967,312 | B2 | 3/2015 | Yanagi |
| 10,065,491 | B1 | 9/2018 | Syed et al. |
| 11,034,229 | B2 | 6/2021 | Kosuge |
| 11,205,816 | B2 | 12/2021 | Gunther |
| 2018/0138477 | A1 | 5/2018 | Handning et al. |
| 2019/0381899 | A1* | 12/2019 | Günther ............ H01M 50/224 |

FOREIGN PATENT DOCUMENTS

| | | | | |
|---|---|---|---|---|
| CN | 107464898 | A | * 12/2017 | ........... H01M 50/20 |
| CN | 107732058 | A |   2/2018 | |
| CN | 207474499 | U | * 6/2018 | |
| CN | 107878172 | B |   1/2020 | |

(Continued)

OTHER PUBLICATIONS

Machine translation of CN-107464898-A (Year: 2017).*
Machine translation of CN-207474499-U (Year: 2018).*

*Primary Examiner* — Gregg Cantelmo
(74) *Attorney, Agent, or Firm* — Harness, Dickey & Pierce, P.L.C.

(57) ABSTRACT

A battery box for a hybrid or electric vehicle, the battery box including a pair of longitudinal walls and a pair of lateral walls that cooperate with a drop-in floor to define an interior compartment of the battery box for holding one or more batteries. The battery box includes corner junctions where the lateral walls are attached to the longitudinal walls and further includes corner shields that are placed over the corner junctions. The corner shields are externally mounted outside of the interior compartment and provide fluid tight sealing over the corner junctions. The longitudinal and lateral walls are made of dual phase steel. The corner shields have complex corners and are therefore made of draw steel.

20 Claims, 5 Drawing Sheets

(56) References Cited

FOREIGN PATENT DOCUMENTS

| | | |
|---|---|---|
| CN | 111146383 A | 5/2020 |
| CN | 211605235 U | 9/2020 |
| CN | 211641861 U | 10/2020 |
| CN | 111002814 B | 4/2021 |
| CN | 107887536 B | 8/2021 |
| DE | 102016121252 B4 | 7/2021 |
| EP | 3958384 A1 | 2/2022 |
| JP | 5552109 B2 | 7/2014 |
| JP | 6526961 B2 | 6/2019 |

* cited by examiner

CORNER SHIELD FOR ELECTRIC VEHICLE BATTERY BOX

FIELD

The present disclosure relates to battery boxes for holding the batteries of an electric vehicle. More particularly, the present disclosure provides for a corner shield assembly that forms the sealed corners of the battery box.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Fully electric vehicles (i.e., EVs) and hybrid electric vehicles (e.g., PHEVs) often require a large battery bank to power the electric motor(s) that drive the vehicle. In addition to their substantial weight, such batteries can give off a substantial amount of heat during charging and discharging cycles and also need to be protected from impact in the event of a collision. As a result, the batteries that power electric and hybrid electric vehicles are typically mounted in a reinforced battery box that is secured to the vehicle frame or chassis. Many battery boxes are sealed or partially sealed and house cooling components to extract heat from the batteries.

SUMMARY

This section provides a general summary of the disclosure and is not a comprehensive disclosure of its full scope or all of its features.

In accordance with an aspect of the present disclosure, a battery box for a vehicle is provided, which includes a pair of first and second longitudinal walls that run parallel to one another in a laterally spaced apart arrangement and a pair of first and second lateral walls that extend between the pair of first and second longitudinal walls. The pair of first and second lateral walls run parallel to one another in a longitudinally spaced apart arrangement and therefore cooperate with the pair of first and second longitudinal walls to define an interior compartment of the battery box for holding one or more batteries.

The battery box includes a first pair of corner junctions where the first lateral wall is fixably attached to the first and second longitudinal walls and a second pair of corner junctions where the second lateral wall is fixably attached to the first and second longitudinal walls. The battery box further includes a first pair of corner shields that are placed over the first pair of corner junctions and a second pair of corner shields that are placed over the second pair of corner junctions. The corner shields are externally mounted outside of the interior compartment and provide fluid tight sealing over the corner junctions.

In accordance with one aspect of the present disclosure, the first and second longitudinal walls and the first and second lateral walls are made of a first material comprising a dual phase (DP) steel. According to this aspect of the present disclosure, the corner junctions are load bearing connections between the first and second longitudinal walls and the first and second lateral walls. Each corner shield has one or more complex corners formed by planar wall segments that extend in at least three different planes. The complex corners of the corner shields cannot easily be formed in dual phase (DP) steel sheets, so the corner shields are made of a second material that is different from the first material and are not the primary load bearing structure at the corner junctions. For example, in accordance with an aspect of the present disclosure, the corner shields are made of a second material comprising draw steel (DDS).

In accordance with another aspect of the present disclosure, the first pair of corner junctions includes a first tongue where the first lateral wall is fixably attached to the first longitudinal wall and a second tongue where the first lateral wall is fixably attached to the second longitudinal wall. Similarly, the second pair of corner junctions includes a third tongue where the second lateral wall is fixably attached to the first longitudinal wall and a fourth tongue where the second lateral wall is fixably attached to the second longitudinal wall. The tongues do not extend the full height of the longitudinal and lateral walls and as a result the corner junctions are not fluid tight due to the gaps and tolerances above and below the tongues. To address this, the first pair of corner shields are placed over the first pair of corner junctions and the second pair of corner shields are placed over the second pair of corner junctions. Again, the corner shields are externally mounted outside of the interior compartment and provide fluid tight sealing over the corner junctions.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
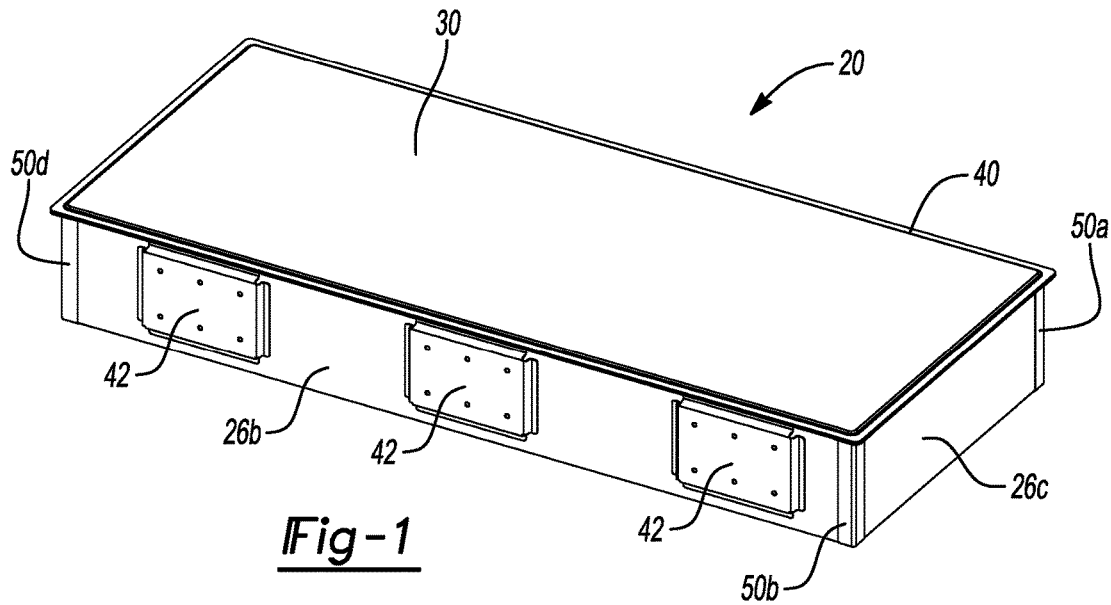
FIG. 1 is a top perspective view of an exemplary battery box constructed in accordance with the present disclosure where the battery box is shown with a lid installed on top of the longitudinal and lateral walls of the battery box.

Referring to the Figures, wherein like numerals indicate corresponding parts throughout the several views, a battery box 20 is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
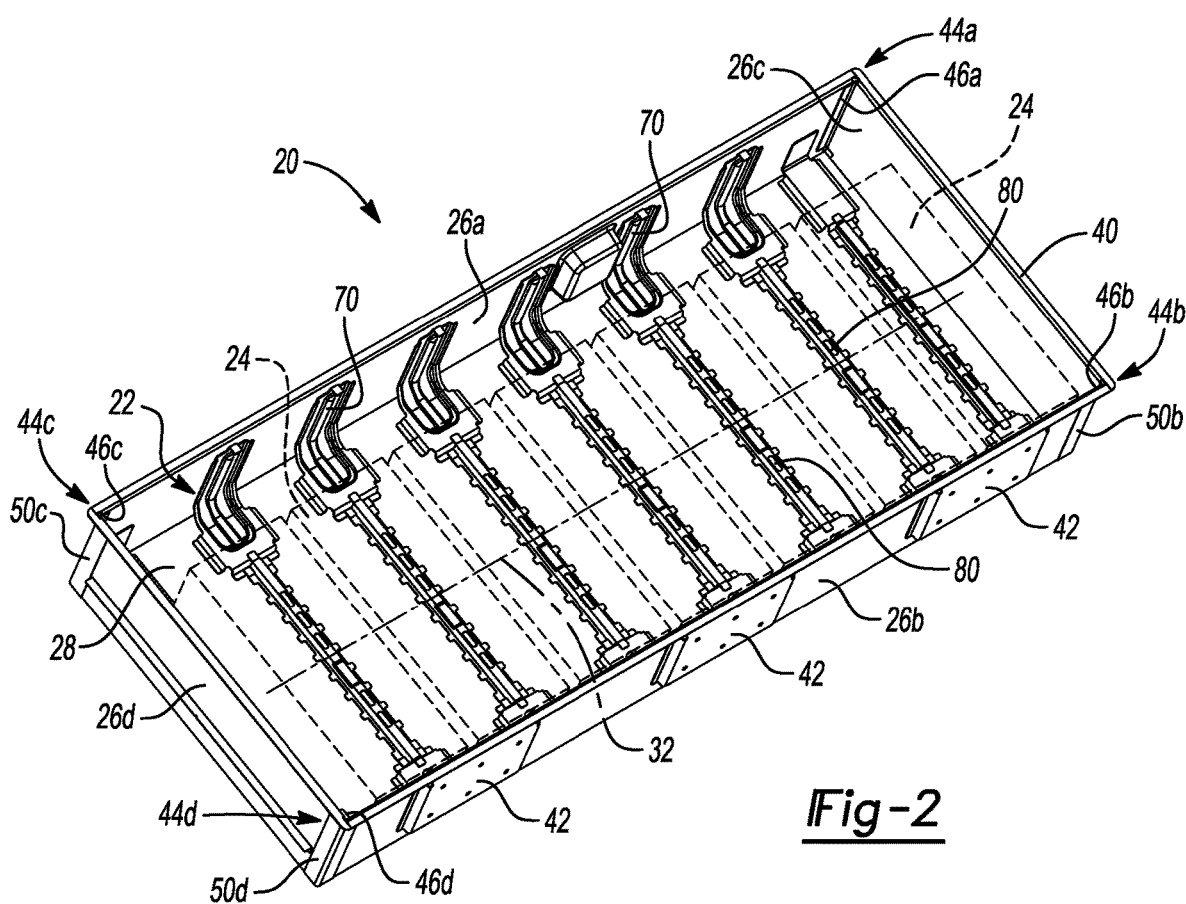
FIG. 2 is a top perspective view of the exemplary battery box illustrated in FIG. 1, but is shown with the lid removed.
Figure 3:
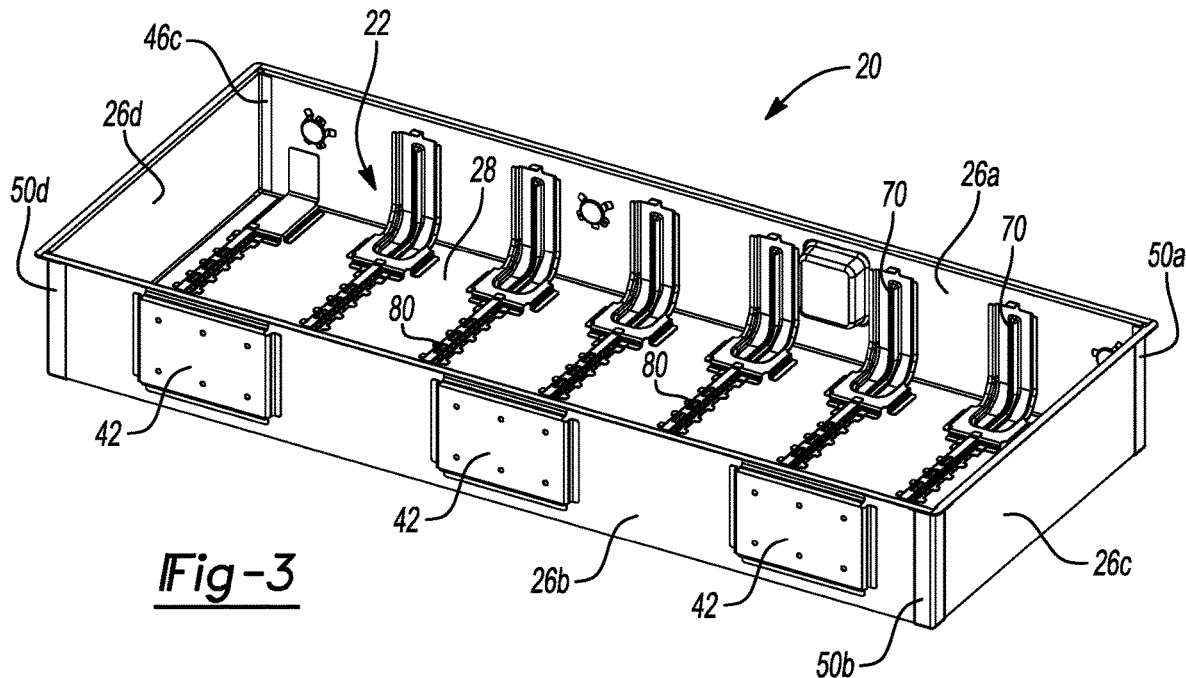
FIG. 3 is another top perspective view of the exemplary battery box illustrated in FIG. 2.

With reference to FIGS. 1-3, a battery box 20 for a vehicle, such as a fully electric vehicle or a hybrid electric vehicle is illustrated. As will be explained in greater detail below, the battery box 20 is configured to be mounted to the frame, chassis, or body structure of the vehicle and includes an interior compartment 22 for holding the one or more batteries 24 that provide electrical power to the electric motor(s) used to drive the vehicle. The battery box 20 generally includes a pair of first and second longitudinal walls 26a, 26b, a pair of first and second lateral walls 26c, 26d, a floor 28, and a lid 30. Together, these components cooperate to define the interior compartment 22 of the battery box 20, which may be sealed from the rest of the vehicle and the external environment.

In the illustrated example, the longitudinal walls 26a, 26b are longer than the lateral walls 26c, 26d. It should be appreciated however that other configurations are possible including where the lateral walls 26c, 26d are longer than the longitudinal walls 26a, 26b. It should also be appreciated that the battery box 20 can be installed in a vehicle in a number of different orientations and the words "longitudinal" and "lateral" as used herein describe the battery box 20 itself and do not necessarily correspond or relate to the longitudinal and lateral dimensions of the vehicle to which the battery box 20 is mounted. For example, the battery box 20 described herein could be mounted in a vehicle such that the lateral walls 26c, 26d extend across the vehicle from the driver's side to the passenger's side of the vehicle, or alternatively, the battery box 20 could be mounted in a vehicle such that the longitudinal walls 26a, 26b extend across the vehicle from the driver's side to the passenger's side of the vehicle. It should also be appreciated that the battery box 20 described herein could be mounted in a vertical orientation. For example and without limitation, the battery box 20 may be mounted in the vehicle with the longitudinal walls 26a, 26b oriented substantially perpendicular to the ground.

The interior compartment 22 of the battery box 20 is depicted as receiving seven batteries 24 in a side-by-side arrangement in FIG. 2. In addition, the batteries 24 are positioned in the interior compartment 22 in an off-center arrangement where the gap between the batteries 24 and the first longitudinal wall 26a is larger than the gap between the batteries 24 and the second longitudinal wall 26b. This off-center arrangement provides space between the batteries 24 and the first longitudinal wall 26a to accommodate various cooling components (e.g., heat exchangers, coolant lines, and fans) and/or electrical components (e.g., battery chargers, charge controllers, voltmeters, etc.). As a result, the center of gravity of the battery box 20 may be laterally spaced (i.e., offset) from a centerline 32 of the battery box 20. Thus, the design of the battery box 20 is specifically adapted to accommodate this off-center (i.e., lopsided) load. Notwithstanding the foregoing, it should be appreciated that a different number of batteries 24 may be used than the number of batteries 24 shown in the Figures and the batteries 24 may be placed in different locations and/or arrangements inside the interior compartment 22 of the battery box 20 than that shown without departing from the scope of the appended claims.

Still referring to FIGS. 1-3, the pair of first and second longitudinal walls 26a, 26b run parallel in a laterally spaced apart arrangement. The pair of first and second lateral walls 26c, 26d extend between the pair of first and second longitudinal walls 26a, 26b and thus the pair of first and second lateral walls 26c, 26d run parallel in a longitudinally spaced apart arrangement. Each longitudinal and lateral wall 26a-26d has a top edge 34 and a bottom edge 36. The bottom edge 36 of the longitudinal and lateral walls 26a-26d includes an inwardly extending flange 38 and the top edge 34 of the longitudinal and lateral walls 26a-26d includes an outwardly extending flange 40.

The floor 28 is a drop-in floor that extends across and below the interior compartment 22 of the battery box 20. The floor 28 is positioned above the inwardly extending flange 38 on the bottom edge 36 of the longitudinal and lateral walls 26a-26d in an overlapping and abutting arrangement. After the floor 28 is positioned over the inwardly extending flange 38, the floor 28 is secured to the inwardly extending flange 38. In the illustrated example, the floor 28 is permanently secured to the inwardly extending flange 38 by spot welding, which provides a strong and economical connection. Notwithstanding the foregoing, it should be appreciated that other structures or methods for securing the floor 28 to the inwardly extending flange 38 may be utilized.

The lid 30 extends across and above the interior compartment 22 of the battery box 20. The lid 30 is positioned above the outwardly extending flange 40 on the top edge 34 of the longitudinal and lateral walls 26a-26d in an overlapping and abutting arrangement such that the lid 30 is secured to the outwardly extending flange 40. Although other configurations are possible, in the illustrated example, the lid 30 is secured to the outwardly extending flange 40 by bolts or other fasteners (not shown) such that the lid 30 may be removed to provide access to the interior compartment 22 of the battery box 20. It should be appreciated that providing some access to the interior compartment 22 of the battery box 20 is important so that the batteries 24, cooling components, and electrical components mounted in the interior compartment 22 can be inspected, serviced, and/or replaced.

The battery box 20 in the illustrated example also has multiple frame brackets 42 attached to the first and second longitudinal walls 26a, 26b at longitudinally spaced apart locations. The frame brackets 42 are configured to be secured to the frame, chassis, or body structure of the vehicle (not shown). By way of example and without limitation, the frame brackets 42 may be secured to the vehicle using fasteners such as bolts, screws, or threaded studs (not shown). It should be appreciated that many possible configurations exist where the frame brackets 42 have a different location or configuration than that shown in the Figures. It should also be appreciated that in some embodiments the frame brackets 42 could be eliminated and the floor 28, lid 30, longitudinal walls 26a, 26b, and/or lateral walls 26c, 26d could be directly or indirectly secured to the vehicle.

With additional reference to FIGS. 4-7, the battery box 20 includes a first pair of corner junctions 44a, 44b where the first lateral wall 26c is fixably attached to the first and second longitudinal walls 26a, 26b and a second pair of corner junctions 44c, 44d where the second lateral wall 26d is fixably attached to the first and second longitudinal walls 26a, 26b. By way of example and without limitation, the first pair of corner junctions 44a, 44b includes a first tongue 46a where the first lateral wall 26c is fixably attached to the first longitudinal wall 26a and a second tongue 46b where the first lateral wall 26c is fixably attached to the second longitudinal wall 26b. Similarly, the second pair of corner junctions 44c, 44d includes a third tongue 46c where the second lateral wall 26d is fixably attached to the first longitudinal wall 26a and a fourth tongue 46d where the second lateral wall 26d is fixably attached to the second longitudinal wall 26b. Thus, the corner junctions 44a-44d are the primary mechanical, load bearing connections between the longitudinal and lateral walls 26a-26d.

Each tongue 46a-46d is integral with and bent ninety degrees from an end of one of the longitudinal or lateral walls 26a-26d and is arranged to overlap and abut another end of an adjoining longitudinal or lateral wall 26a-26d. In the illustrated example, spot welds on the first tongue 46a form a permanent connection between the first lateral wall 26c and the first longitudinal wall 26a, spot welds on the second tongue 46b form a permanent connection between the first lateral wall 26c and the second longitudinal wall 26b, spot welds on the third tongue 46c form a permanent connection between the second lateral wall 26d and the first longitudinal wall 26a, and spot welds on the fourth tongue 46d form a permanent connection between the second lateral wall 26d and the second longitudinal wall 26b. Thus, each tongue 46a-46d extends vertically and provides an area where spot welds can be applied to form a permanent connection between the longitudinal and lateral walls 26a-26d. In the illustrated example, the first and second tongues 46a, 46b are integral with and extend from the first lateral wall 26c at perpendicular angles and the third and fourth tongues 46c, 46d are integral with and extend from the second lateral wall 26d at perpendicular angles; however, it should be appreciated that the tongues 46a-46d could alternatively be integral with and extend from the longitudinal walls 26a, 26b at perpendicular angles to contact and overlap with the ends of the lateral walls 26c, 26d.

Figure 7:
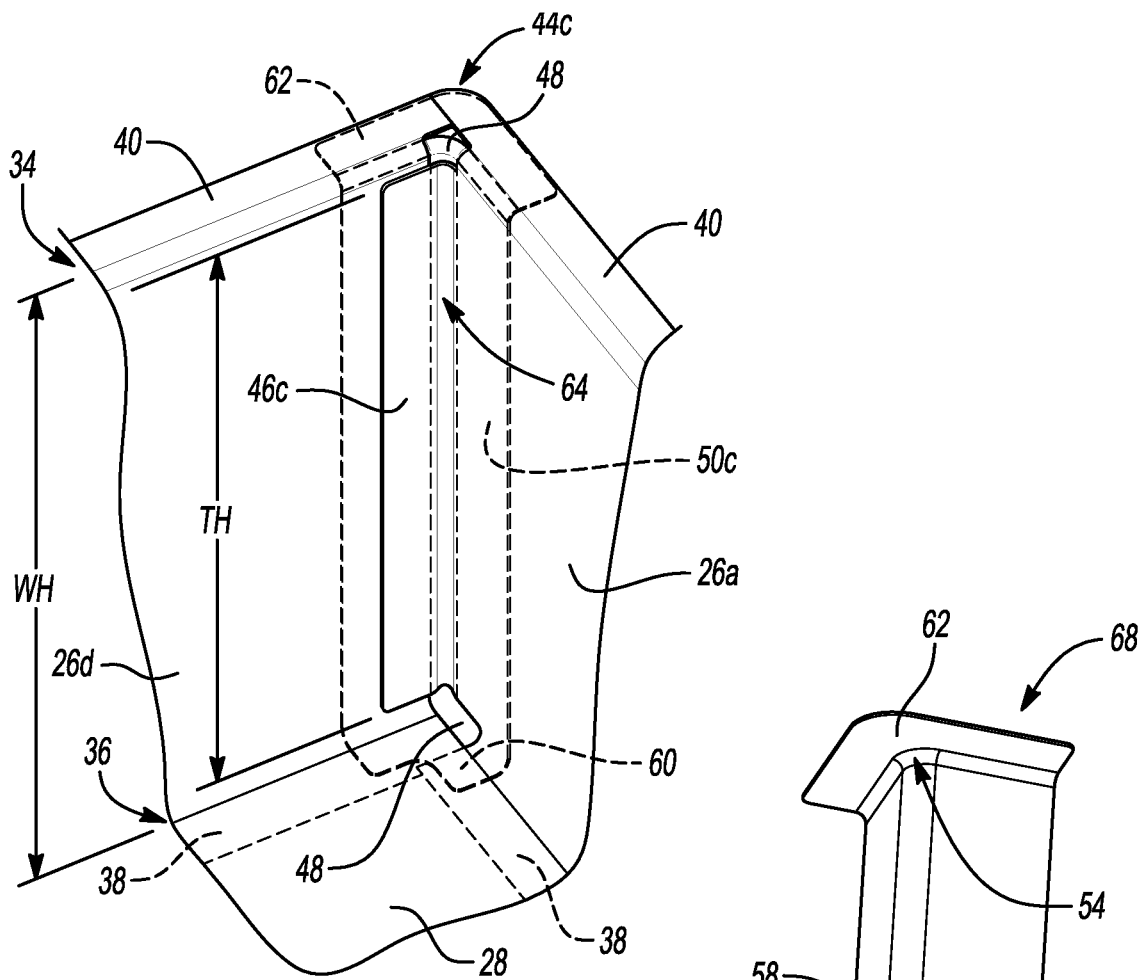
FIG. 7 is another top perspective view of the corner of the exemplary battery box illustrated in FIG. 4, which is shown from inside the battery box with the corner shield illustrated in dashed lines.

As best seen in FIG. 7, the longitudinal and lateral walls 26a-26d of the battery box 20 have an overall wall height WH that is substantially the same and is measured between the inwardly extending flange 38 at the bottom edge 36 of the longitudinal and lateral walls 26a-26d and the outwardly extending flange 40 at the top edge 34 of the longitudinal and lateral walls 26a-26d. The longitudinal and lateral walls 26a-26d are preferably formed from sheets of a first material comprising dual phase (DP) high strength steel. This material is strong, light, and provides good impact/crash performance. When this material is selected, the inwardly extending flange(s) 38, the outwardly extending flange(s) 40, and the tongues 46a-46d can also be formed in an economical manner by simple bending processes that leave a simple ninety degree corner between the longitudinal and lateral walls 26a-26d and the inwardly extending flange(s) 38, the outwardly extending flange(s) 40, and the tongues 46a-46d. In order to economically form these features using simple bending processes and to provide clearance for bending, each tongue 46a-46d has an overall tongue height TH that is less than the overall wall height WH such that gaps 48 exist at the corner junctions 44a-44d between each tongue 46a-46d and the inwardly extending flange(s) 38 at the bottom edge 36 of the longitudinal and lateral walls 26a-26d and between each tongue 46a-46d and the outwardly extending flange(s) 40 at the top edge 34 of the longitudinal and lateral walls 26a-26d. These gaps 48, which are the result of an economical yet effective manufacturing process, must be sealed to prevent the intrusion of water and contaminants into the interior compartment 22 of the battery box 20 and to thermally isolate the interior compartment 22 of the battery box 20 from the external (i.e., ambient) environment.

To that end, the battery box 20 includes a first pair of corner shields 50a, 50b, placed over the first pair of corner junctions 44a, 44b, that are externally mounted outside of the interior compartment 22 to provide fluid tight sealing over the first pair of corner junctions 44a, 44b. Similarly, a second pair of corner shields 50c, 50d, placed over the second pair of corner junctions 44c, 44d, that are externally mounted outside of the interior compartment 22 to provide fluid tight sealing over the second pair of corner junctions 44c, 44d. The corner shields 50a-50d are externally mounted to the battery box 20 using an adhesive or sealant to provide a fluid tight seal over the spot welded connections at the corner junctions 44a-44d of the battery box 20. Prior to hardening or curing, the adhesive or sealant flows into and fills the gaps 48 above and below each tongue 46a-46d and any other clearances in the corner junctions 44a-44d to create a fluid tight seal. After hardening or curing, the adhesive or sealant mechanically bonds the corner shields 50a-50d to the ends of the longitudinal and lateral walls 26a-26d. Spot welds may also be used to position the corner shields 50a-50d during assembly and to augment the bond strength of the adhesive or sealant.

Figure 8:
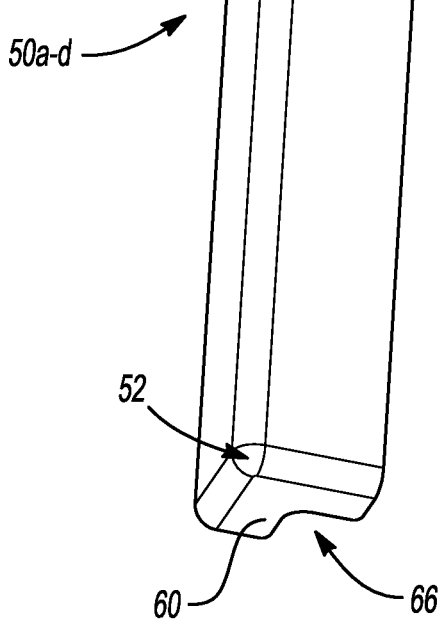
FIG. 8 is a bottom perspective view of the exemplary corner shield shown in the same orientation as FIG. 5.

With additional reference to FIG. 8, each corner shield 50a-d has one or more complex corners 52, 54 to provide a fluid tight seal over the spot welded connections at the corner junctions 44a-44d of the battery box 20. As used herein, the term "complex corner" means a corner that is formed by planar wall segments that extend in at least three different planes. This stands in contrast to the simple ninety degree bends forming the inwardly extending flange(s) 38, outwardly extending flange(s) 40, and tongues 46a-46d. As noted above, the inwardly extending flange(s) 38, outwardly extending flange(s) 40, and tongues 46a-46d can be formed using simple bending operations. Simple bending operations cannot be used to form the complex corners 52, 54 of the corner shields 50a-50d. Instead, the complex corners 52, 54 are preferably formed using drawing or deep drawing manufacturing processes. Dual phase (DP) steel is generally not compatible with such processes. Thus, the corner shields 50a-50d are made of a second material that is different from the first material (i.e., the dual phase steel). For example, the second material forming the corner shields 50a-50d may comprise draw steel (DS), which is also referred to as deep drawing steel (DDS).

Figure 4:
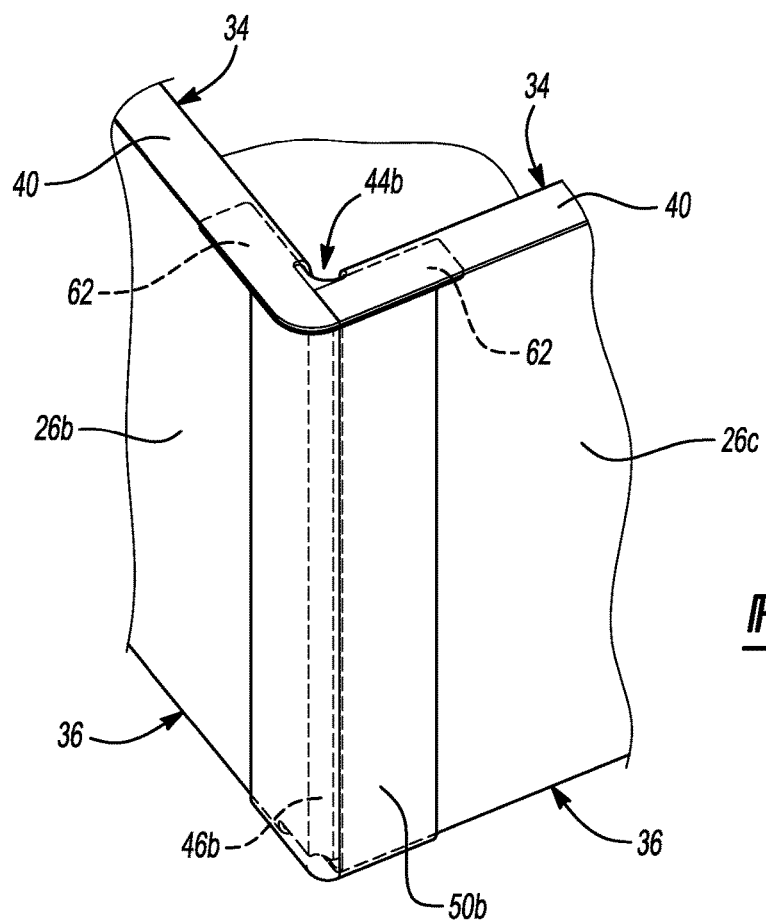
FIG. 4 is a top perspective view of one of the four corners of the exemplary battery box illustrated in FIG. 2, which includes a corner shield.
Figures 5, 6:
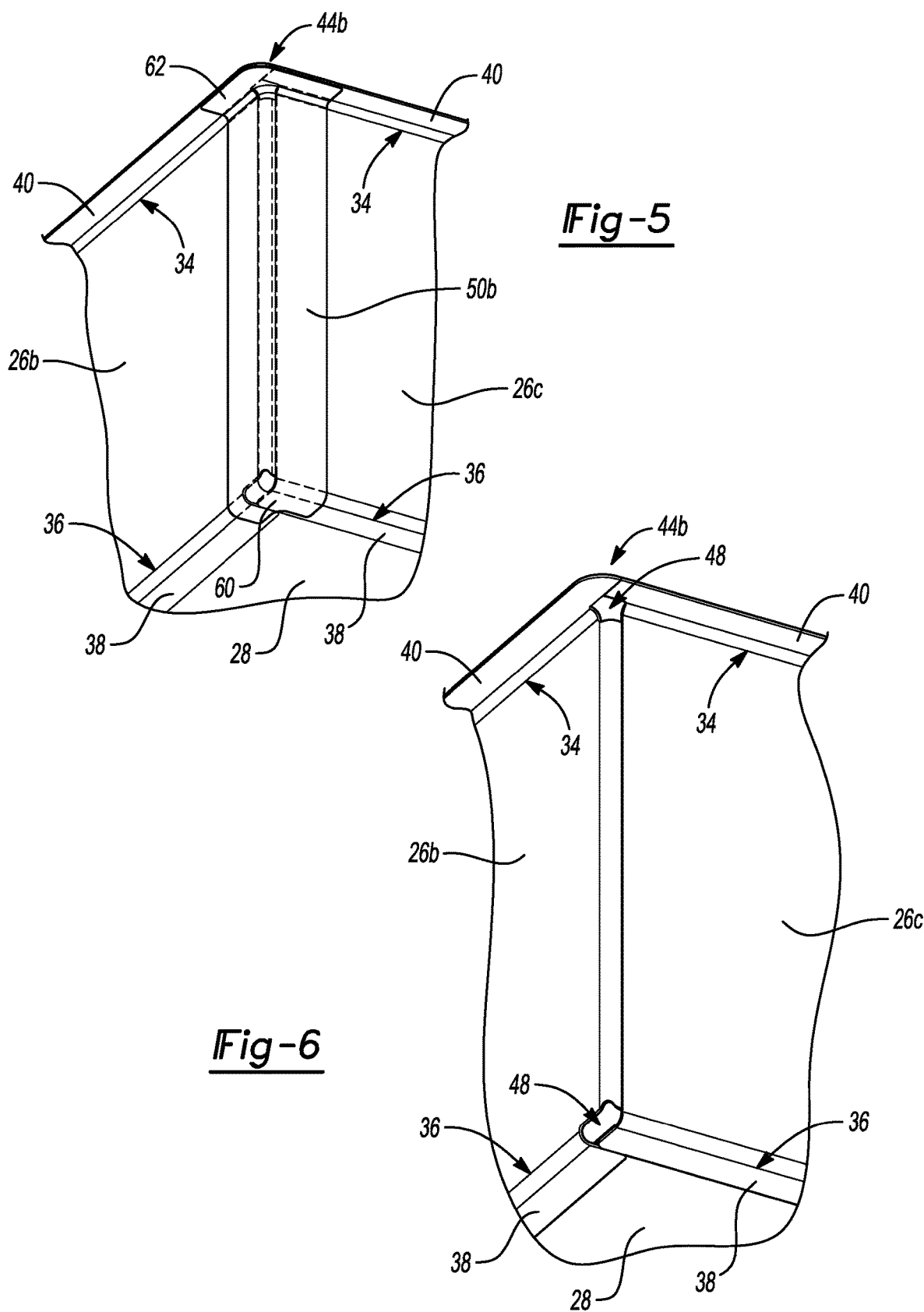
FIG. 5 is a bottom perspective view of the corner of the exemplary battery box illustrated in FIG. 4, which is shown with the corner shield installed.
FIG. 6 is a bottom perspective view of the corner of the exemplary battery box illustrated in FIG. 4, which is shown with the corner shield removed.

Each corner shield 50a-50d has two complex corners 52, 54 that are each formed by planar wall segments 56, 58, 60, 62 that extend in at least three different planes. The complex corners 52, 54 cover and seal the gaps 48 at the corner junctions 44a-44d between the tongue(s) 46a-46d and the inwardly extending flange(s) 38 and between the tongue(s) 46a-46d and the outwardly extending flange(s) 40. The planar wall segments 56, 58, 60, 62 of each corner shield include first and second planar wall segments 56, 58 that form a wedge-shaped channel 64 that extends vertically between a closed end 66 and an open end 68. The wedge-shaped channel 64 is formed by a bend radius between the first and second planar wall segments 56, 58 that is larger than 5 millimeters (mm), which is larger (i.e., a more gradual bend) than the sharper ninety degree bends between the lateral walls 26c, 26d and the tongues 46a-46d. The planar wall segments 56, 58, 60, 62 of each corner shield 50a-50d also include an inwardly extending planar wall segment 60 that forms a first complex corner 52 at the closed end 66 of the wedge-shaped channel 64 and an outwardly extending planar wall segment 62 that forms a second complex corner 54 at the open end 68 of the wedge-shaped channel 64. As best seen in FIGS. 4, 5, and 7, the inwardly extending planar wall segment 60 of each corner shield 50a-50d is positioned underneath the inwardly extending flange 38 of the battery box 20 in an overlapping and abutting arrangement and the outwardly extending planar wall segment 62 of each corner shield 50a-50d is positioned underneath the outwardly extending flange 40 of the battery box 20 in an overlapping and abutting arrangement.

Figure 9:
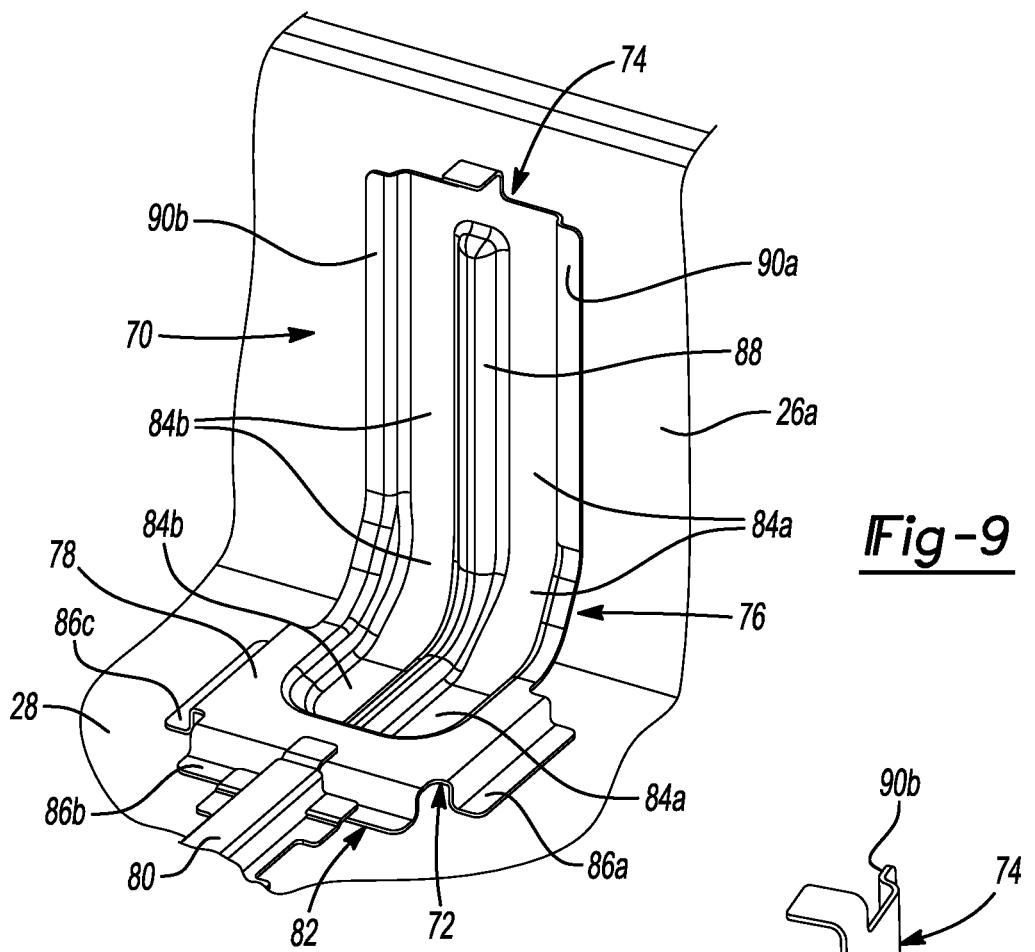
FIG. 9 is a top perspective view of one of the mounting brackets of the exemplary battery box illustrated in FIG. 3.
Figure 10:
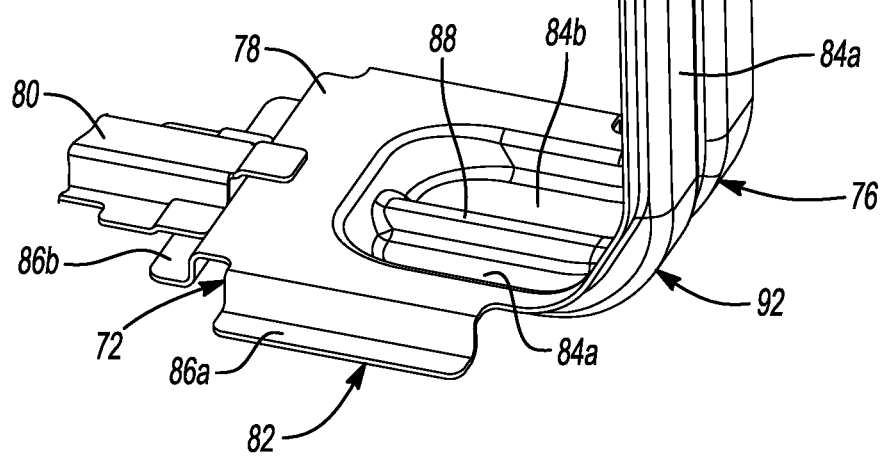
FIG. 10 is another top perspective view of the exemplary mounting bracket illustrated in FIG. 9.

As shown in FIGS. 2 and 3, the battery box includes multiple mounting brackets 70 extending between the floor 28 and the longitudinal walls 26a, 26b at longitudinally spaced apart locations. Preferably, the mounting brackets 70 are made of high strength low-alloy (HSLA) steel and/or dual phase (DP) steel. With further reference to FIGS. 9 and 10, each mounting bracket 70 includes a raised base 72, an upright segment 74, and a curved transition segment 76 that extends from the raised base 72 to the upright segment 74. A portion of the raised base is spaced above the floor to provide a battery stand-off surface 78 that is configured to support one of the batteries 24 in the interior compartment 22 of the battery box 20. More specifically, a battery 24 may be secured to the raised base 72 by a screw, bolt, threaded stud, or other fastener (not shown). The raised base 72 also provides an underside mounting surface for permanently attaching the fastener. For example, the threaded stud of the fastener may extend up through a hole in the raised base 72 and the head of the fastener may abut the underside mounting surface of the raised base 72. In such a configuration, the head of the fastener may then be welded to the underside mounting surface of the raised base 72. The upright segment 74 of each mounting bracket 70 is attached to one of the first and second longitudinal walls 26a or 26b opposite one of the frame brackets 42. In other words, the frame brackets 42 and the mounting brackets 70 are substantially aligned with one another such that a portion of one of the first and second longitudinal walls 26a or 26b is sandwiched between each frame bracket 42 and mounting bracket 70 to provide a direct load path from each frame bracket 42 to at least one corresponding mounting bracket 70. This improves the impact/crash strength of the battery box 20 by resisting forces that would otherwise bend, break, or buckle the longitudinal walls 26a, 26b of the battery box 20. The battery box 20 also has cross-bars 80 that extend laterally across the floor 28 between the raised base 72 of each mounting bracket 70 to another mounting bracket 70 attached to the opposite longitudinal wall 26a or 26b. These cross-bars 80 provide improved impact/crash strength by resisting forces that would otherwise bend, break, or buckle the floor 28 of the battery box 20.

As best seen in FIGS. 9 and 10, the raised base 72 of each mounting bracket 70 includes a peripheral rim 82 and one or more depressions 84a, 84b that are adapted to contact and be fixably attached to the floor 28. The peripheral rim 82 of the raised base 72 includes one or more flanges 86a, 86b, 86c that are fixably attached to the floor 28. The depression(s) 84a, 84b extend in a continuous manner from the raised base 72, across the transition segment 76 of the mounting bracket 70, and across at least a portion of the upright segment 74 where the depression(s) 84a, 84b contact and are fixably attached to one of the first and second longitudinal walls 26a or 26b. In the illustrated example, the mounting bracket includes a pair of depressions 84a, 84b and a rib 88 that is positioned between the pair of depressions 84a, 84b. Like the pair of depressions 84a, 84b, the rib 88 also extends in a continuous manner from the raised base 72, across the transition segment 76 of the mounting bracket 70, and across at least a portion of the upright segment 74.

The upright segment 74 of each mounting bracket 70 includes a pair of raised edges 90a, 90b on each side of the depressions 84a, 84b that are spaced away from the adjacent longitudinal wall 26a or 26b. The pair of raised edges 90a, 90b also extend across the transition segment 76 of the mounting bracket 70 to the portion of the raised base 72 that is spaced above the floor 28.

Multiple load bearing connections attach the flanges 86a-86c of the peripheral rim 82 to the floor 28. Multiple load bearing connection also attach the depressions 84a, 84b in the raised base 72 to the floor 28. Similarly, multiple load bearing connections attach the depressions 84a, 84b in the upright segment 74 to one of the first and second longitudinal walls 26a or 26b. Preferably, the multiple load bearing connections are spot welds. Thus, the flanges 86a-86c of the peripheral rim 82 and the depressions 84a, 84b significantly increase the surface area of the mounting bracket 70 that comes into abutting contact with the floor 28 and the longitudinal wall 26a or 26b and thus increases the number of locations that can be spot welded. The transition segment of each mounting bracket has a bend radius 92 of more than 25 millimeters. This particular geometry of the transition segment 76 of the mounting bracket 70 provides a gradual load path between the upright segment 74 and the raised base 72, which operates to reduce normal/peel type stress on the spot welds. In addition, the specific geometry and features of the mounting bracket 70 described herein enables the mounting bracket 70 to flex some instead of being completely rigid, which also improves impact/crash performance.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A battery box for a vehicle, comprising:
   a pair of first and second longitudinal walls that run parallel in a laterally spaced apart arrangement;
   a pair of first and second lateral walls that extend between the pair of first and second longitudinal walls and that run parallel in a longitudinally spaced apart arrangement to define an interior compartment of the battery box for holding one or more batteries;
   a first pair of corner junctions where the first lateral wall is fixably attached to the first and second longitudinal walls;
   a second pair of corner junctions where the second lateral wall is fixably attached to the first and second longitudinal walls;
   a first pair of corner shields, placed over the first pair of corner junctions, that are externally mounted outside of the interior compartment to provide fluid tight sealing over the first pair of corner junctions;
   a second pair of corner shields, placed over the second pair of corner junctions, that are externally mounted outside of the interior compartment to provide fluid tight sealing over the second pair of corner junctions;
   wherein the first and second longitudinal walls and the first and second lateral walls are made of a first material comprising a dual phase steel and the corner junctions are load bearing connections between the first and second longitudinal walls and the first and second lateral walls,
   wherein the corner shields are made of a second material that is different from the first material and each corner shield has one or more complex corners formed by planar wall segments that extend in at least three different planes.

2. The battery box of claim 1, wherein the planar wall segments of each corner shield include first and second planar wall segments that form a wedge-shaped channel that extends vertically between a closed end and an open end.

3. The battery box of claim 2, wherein the planar wall segments of each corner shield include an inwardly extending planar wall segment that forms a first complex corner at the closed end of the wedge-shaped channel.

4. The battery box of claim 3, wherein each longitudinal and lateral wall has a bottom edge that includes an inwardly extending flange and wherein the inwardly extending planar wall segment of each corner shield is positioned underneath the inwardly extending flange in an overlapping and abutting arrangement.

5. The battery box of claim 4, further comprising:
   a drop-in floor extending across the interior compartment of the battery box and positioned above the inwardly extending flange in an overlapping and abutting arrangement such that the drop-in-floor is secured to the inwardly extending flange.

6. The battery box of claim 2, wherein the planar wall segments of each corner shield include an outwardly extending planar wall segment that forms a second complex corner at the open end of the wedge-shaped channel.

7. The battery box of claim 6, wherein each longitudinal and lateral wall has a top edge that includes an outwardly extending flange and wherein the outwardly extending planar wall segment of each corner shield is positioned underneath the outwardly extending flange in an overlapping and abutting arrangement.

8. The battery box of claim 7, further comprising:
   a lid extending across the interior compartment of the battery box and positioned above the outwardly extending flange in an overlapping and abutting arrangement such that the lid is secured to the outwardly extending flange.

9. The battery box of claim 1, wherein the second material forming the corner shields comprises draw steel.

10. A battery box for a vehicle, comprising:
    a pair of first and second longitudinal walls that run parallel in a laterally spaced apart arrangement;
    a pair of first and second lateral walls that extend between the pair of first and second longitudinal walls and that run parallel in a longitudinally spaced apart arrangement to define an interior compartment of the battery box for holding one or more batteries;
    a first pair of corner junctions including a first tongue where the first lateral wall is fixably attached to the first longitudinal wall and a second tongue where the first lateral wall is fixably attached to the second longitudinal wall;
    a second pair of corner junctions including a third tongue where the second lateral wall is fixably attached to the first longitudinal wall and a fourth tongue where the second lateral wall is fixably attached to the second longitudinal wall;
    a first pair of corner shields, placed over the first pair of corner junctions, that are externally mounted outside of the interior compartment to provide fluid tight sealing over the first pair of corner junctions; and
    a second pair of corner shields, placed over the second pair of corner junctions, that are externally mounted outside of the interior compartment to provide fluid tight sealing over the second pair of corner junctions.

11. The battery box of claim 10, wherein the corner shields are externally mounted over the corner junctions using an adhesive or sealant.

12. The battery box of claim 11, wherein each tongue is integral with and bent ninety degrees from an end of one of the longitudinal or lateral walls and is arranged to overlap and abut another end of an adjoining longitudinal or lateral wall.

13. The battery box of claim 12, wherein each longitudinal and lateral wall has a bottom edge that includes an inwardly extending flange and a top edge that includes an outwardly extending flange.

14. The battery box of claim 13, wherein the longitudinal and lateral walls have an overall wall height and each tongue extends vertically and defines an overall tongue height that is less than the overall wall height such that gaps exist at the corner junctions between the tongue and the inwardly extending flange at the bottom edge of the longitudinal and lateral walls and between the tongue and the outwardly extending flange at the top edge of the longitudinal and lateral walls.

15. The battery box of claim 14, wherein each corner shield has two complex corners that are each formed by planar wall segments that extend in at least three different planes to cover and seal the gaps at the corner junctions between the tongue and the inwardly extending flange and between the tongue and the outwardly extending flange.

16. A battery box for a vehicle, comprising:
a pair of first and second longitudinal walls that run parallel in a laterally spaced apart arrangement;
a pair of first and second lateral walls that extend between the pair of first and second longitudinal walls and that run parallel in a longitudinally spaced apart arrangement to define an interior compartment of the battery box for holding one or more batteries;
a first pair of corner junctions including a first tongue where the first lateral wall is fixably attached to the first longitudinal wall and a second tongue where the first lateral wall is fixably attached to the second longitudinal wall;
a second pair of corner junctions including a third tongue where the second lateral wall is fixably attached to the first longitudinal wall and a fourth tongue where the second lateral wall is fixably attached to the second longitudinal wall;
a first pair of corner shields, placed over the first pair of corner junctions, that are externally mounted outside of the interior compartment to provide fluid tight sealing over the first pair of corner junctions; and
a second pair of corner shields, placed over the second pair of corner junctions, that are externally mounted outside of the interior compartment to provide fluid tight sealing over the second pair of corner junctions,
wherein the first and second longitudinal walls and the first and second lateral walls are made of a first material comprising a dual phase (DP) steel and the corner junctions are load bearing connections between the first and second longitudinal walls and the first and second lateral walls,
wherein the corner shields are made of a second material comprising draw steel (DDS).

17. The battery box of claim 16, wherein spot welds on the first tongue form a permanent connection between the first lateral wall and the first longitudinal wall, spot welds on the second tongue form a permanent connection between the first lateral wall and the second longitudinal wall, spot welds on the third tongue form a permanent connection between the second lateral wall and the first longitudinal wall, and spot welds on the fourth tongue form a permanent connection between the second lateral wall and the second longitudinal wall.

18. The battery box of claim 17, wherein the corner shields are externally mounted using an adhesive or sealant to provide a fluid tight seal over the spot welded connections at the corner junctions of the battery box.

19. The battery box of claim 17, wherein each corner shield has one or more complex corners formed by planar wall segments that extend in at least three different planes to provide a fluid tight seal over the spot welded connections at the corner junctions of the battery box.

20. The battery box of claim 16, wherein each corner shield is made from a single sheet of draw steel (DDS).

* * * * *